Figure 1:
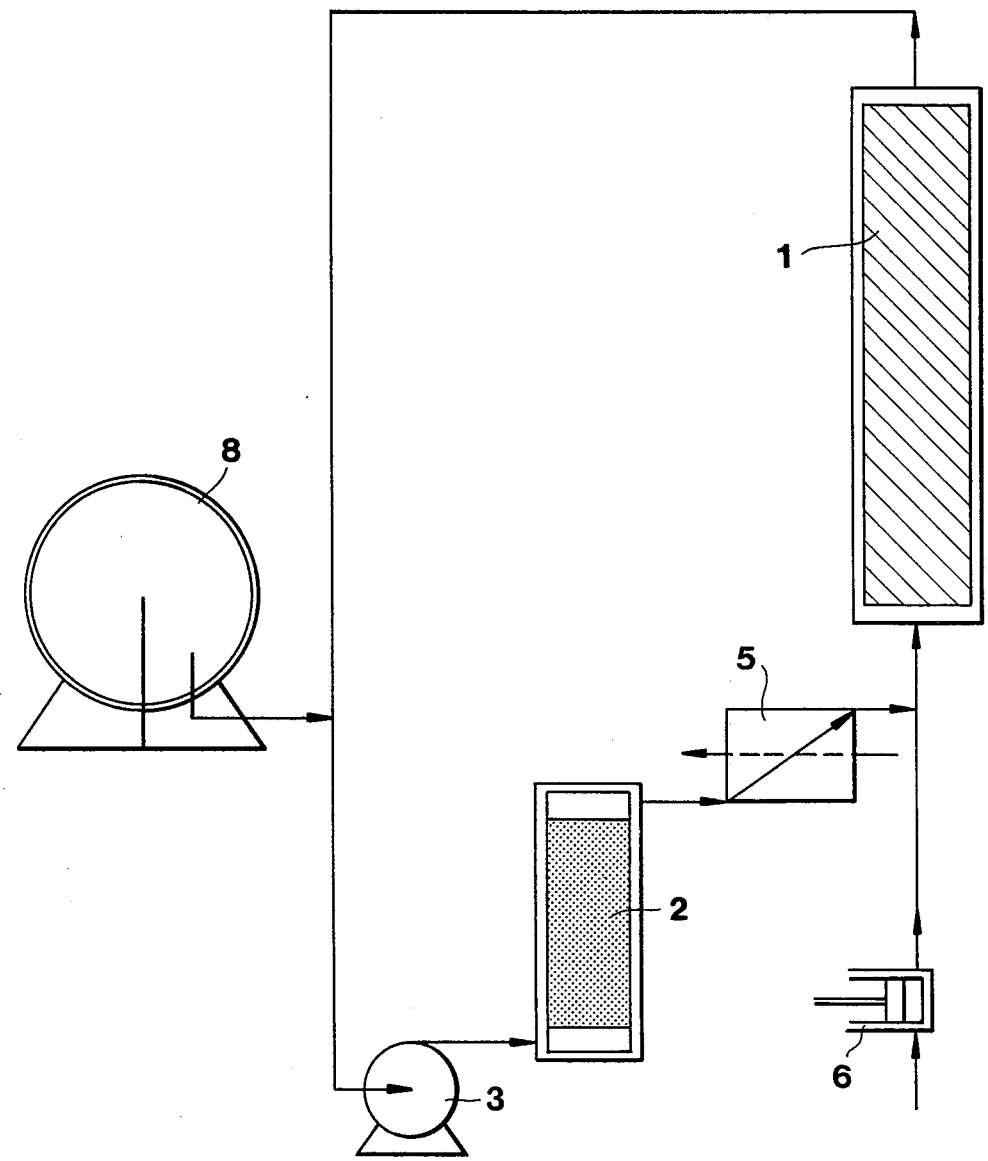

United States Patent [19]

Roselius et al.

[11] 4,255,458

[45] Mar. 10, 1981

[54] METHOD FOR THE SELECTIVE EXTRACTION OF CAFFEINE FROM VEGETABLE MATERIALS

[75] Inventors: Ludwig Roselius, Bremen; Hans-Albert Kurzhals, Heibenbüttel; Peter Hubert, Bremen, all of Fed. Rep. of Germany

[73] Assignee: Hag Aktiengesellschaft, Bremen, Fed. Rep. of Germany

[21] Appl. No.: 914,811

[22] Filed: Jun. 12, 1978

[30] Foreign Application Priority Data

Jun. 16, 1977 [DE] Fed. Rep. of Germany ......... 2727191

[51] Int. Cl.³ .................. A23F 3/20; A23F 3/38; A23F 5/20; A23F 5/22
[52] U.S. Cl. ................................. 426/424; 426/427; 426/428
[58] Field of Search ............... 426/427, 428, 424

[56] References Cited

U.S. PATENT DOCUMENTS

| | | | |
|---|---|---|---|
| 1,957,358 | 5/1934 | Scheele | 426/428 |
| 3,769,033 | 10/1973 | Panzer et al. | 426/428 |
| 3,806,619 | 4/1974 | Zosel | 426/427 X |
| 3,843,824 | 10/1974 | Roselius et al. | 426/427 X |
| 3,879,569 | 4/1975 | Vitzhum et al. | 426/427 |
| 4,081,561 | 3/1978 | Meyer et al. | 426/427 X |

*Primary Examiner*—Joseph M. Golian
*Attorney, Agent, or Firm*—Pollock, Vande Sande & Priddy

[57] ABSTRACT

Method of removing caffeine from vegetable materials using a solvent containing two components:
 (a) a first component which is inherently gaseous under operational conditions, and (b) a second component which, by itself, has physical properties such that a mixture of (a) and (b) is liquid at the operating temperature.

20 Claims, 2 Drawing Figures

METHOD FOR THE SELECTIVE EXTRACTION OF CAFFEINE FROM VEGETABLE MATERIALS

The invention relates to a method for the selective extraction of caffeine from vegetable materials using a liquid solvent which is not injurious to health.

Heretofore, organic solvents, such as esters, aromatic, and halogenated hydrocarbons have mainly been used for methods of extracting caffeine from vegetable materials, in particular those for producing beverages such as coffee or tea. These solvents come in contact either directly with the vegetable material or with its aqueous extracts long enough until the desired degree of caffeine reduction is attained. The treated material is processed after the solvents have been separated.

If organic solvents are used for processing materials from which articles for consumption are made, they must be removed as thoroughly as possible by means of complex and costly processing techniques to ensure that only small quantities of solvents remain in the material so that they do not constitute a health hazard from the point of view of modern technical technology. A disadvantage is that these processings lead to sensory deteriorations in quality in comparison to an unprocessed product. Moreover, the removal of solvents requires considerable technical and analytical effort.

Many of the known organic solvents for decaffeination are flammable, with attendant operational problems.

To overcome these difficulties, methods have recently been proposed which utilize either supercritical or liquid $CO_2$.

It has become evident, however, that methods whose operational conditions give rise to a rigid selectivity of the caffeine extraction lead to uneconomically long processing times and even to a high consumption of energy, as well as to a large amount of apparatus, with resultant economic disadvantages.

It is therefore an object of the invention to provide a method for the selective extraction of caffeine from vegetable materials with a solvent which is not injurious to health and does not have the disadvantages described above. In accordance with the invention, these and other objects are achieved through the use of a solvnt consisting of two components:

(a) a first component which is inherently gaseous under operational conditions;

(b) a second component which, by itself, has physical properties such that a mixture of (a) and (b) is liquid at the operating temperature.

It has surprisingly been found that with appropriate selection of the components of the solution in accordance with the invention an astonishingly selective extraction of caffeine from vegetable materials can be effected without any of the drawbacks mentioned above. Gases that are not hazardous to health especially non-combustible gases, are suitable as first component which are inherently gaseous under operational conditions. Gases are preferred which are found naturally in the vegetable material. These gases may be used alone or in mixtures.

As a rule, the following gases are suitable as first component: $CO_2$, $N_2O$, $SF_6$, $Xe$, $CF_4$, methane, ethane, ethylene, acetylene, cyclopropane.

Suitable as second component which, by itself, has physical properties such that they are liquid at working temperature when mixed under operational conditions with the inherently gaseous component, are materials which are not injurious to health, particularly substances contained in the vegetable material to be extracted, e.g., aliphatic compounds such as propane, butane, and higher members of the paraffin hydrocarbon series; ketones, such as acetone, methyl ethyl ketone; esters, such as methyl or ethyl acetate; glycerides, such as contained in coffee oil.

They may be used alone or mixed with one another. Their choice is determined by the criterion of maximum selectivity and solubility for caffeine, depending on the operational conditions chosen, the type of vegetable material, and the properties of the first component, with which they must form a liquid solution. This means that if the solubility and/or selectivity for caffeine of the first component are relatively low under operational conditions, the second component must be chosen in such a way that the selectivity and solubility of the resultant solution reach a maximum.

In particular, the following vegetable materials can be processed with the method according to the invention: raw coffee (beans or ground), roasted coffee (beans or ground), tea, cola leaves, and aqueous extracts of these natural products.

When processing vegetable materials whose aroma requires special treatment, it is best to remove the aromatic substances from the material to be extracted prior to removing the caffeine in accordance with known methods and to add them to the product after the caffeine has been extracted. Decaffeination of a solid, vegetable material is effected in damp condition, with a water content preferably above the natural moisture conent.

When processing vegetable materials existing in an aqueous solution, it is preferable to choose the components in such a way that the liquid solution has the lowest possible solubility in the aqueous phase to be extracted.

The temperature of the extraction according to the invention preferably lies between approximately 0° and 100° C., more preferably between ambient temperature and 90° C. for extracting a solid vegetable material using $CO_2$ as first component, and more preferably between 0° and 70° C. for removing aqueous extracts. The minimum extraction pressure must be chosen sufficiently high that the solution to be used according to the invention is liquid in the case of the chosen composition and at the required temperature, the extraction pressure upwards being limited solely for reasons of economy because, surprisingly, an increase in pressure, e.g., from 100 to 250 bars at 50° C. in the case of $CO_2$/acetone mixtures, will result in considerable acceleration of the extraction velocity, although the density of the solution is only slightly increased. Conversely, low pressures will make it possible to use simpler apparatus.

The quantity relation of liquid solution to vegetable material must be so large that the extraction time is reduced to a minimum. On the other hand, uneconomically large quantities of solvents must be avoided.

In the method according to the invention, the liquid solution is best circulated in a cycle system. The stream velocity and, hence the level of the circulating mass flow of the liquid solution depends on the other parameters chosen for the process, e.g., type of components, temperature, pressure, and the required extraction period which, depending on the vegetable material being processed, may last from 2 to 10 hours.

The extracted caffeine may be removed from the circulating liquid solution by means of an adsorbent (FIG. 1). All known adsorbents are suitable, e.g., activated charcoal and molecular sieves. The separation of the caffeine from the adsorbent may be effected in accordance with conventional adsorbent-regeneration methods. Regeneration with a liquid solvent is preferred. If the second component of the liquid decaffeination solution is used for this purpose, there is no need for subsequent removal of the residual solvent from the adsorbent, which leads to considerable economical advantages.

Figure 2:
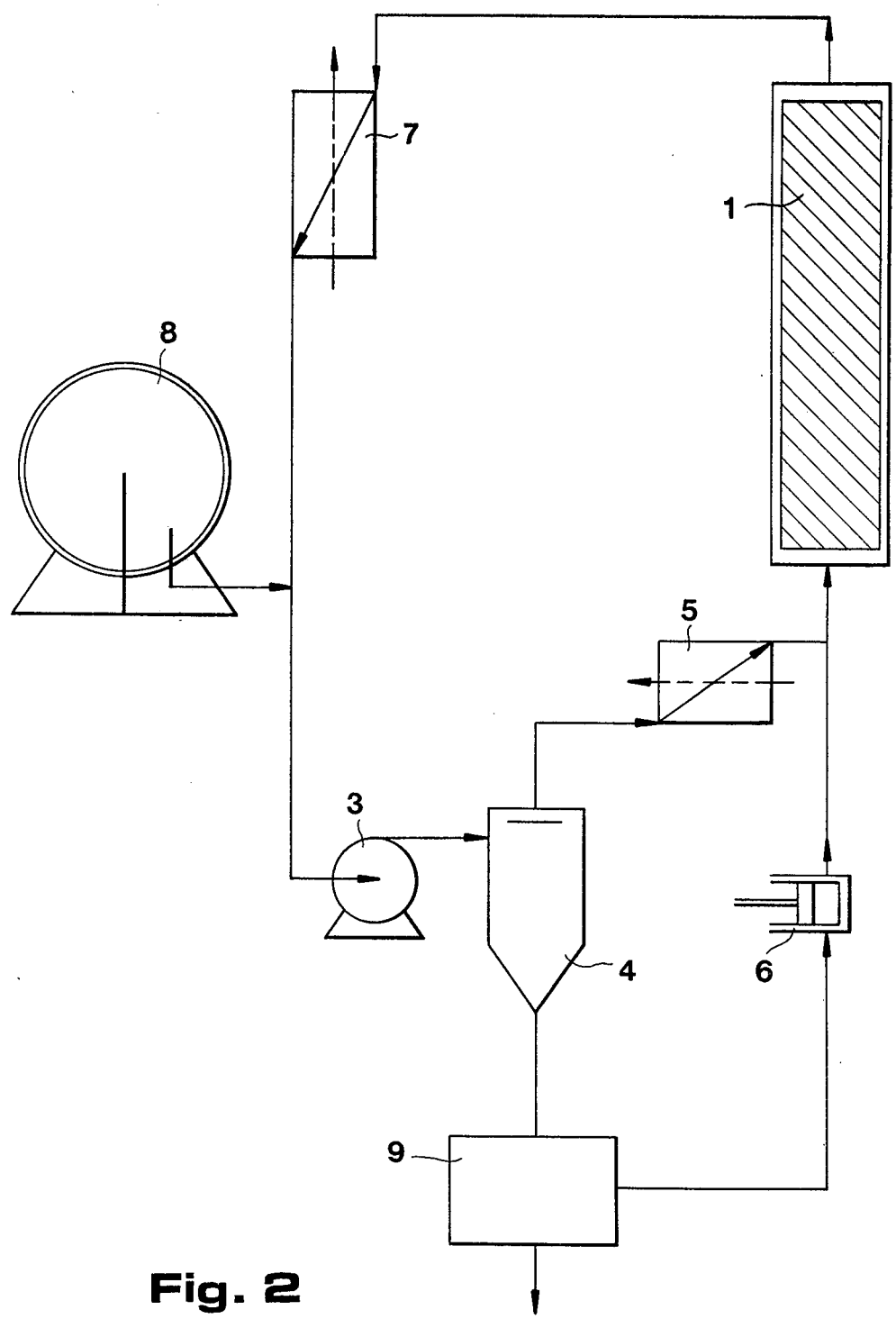

Instead of adsorption, the caffeine may likewise be removed from the cycle system by changing the pressure and/or temperature. In the event liquid decaffeination solutions with a miscibility gap are utilized, the caffeine can very advantageously be extracted by changing the pressure and/or temperature, if the separated second component exhibits a very high dissolving power for caffeine. In this case, a concentrated caffeine solution can continuously be drawn off from the cycle, separated by conventional separation processes, and the pure second component can be returned to the cycle (FIG. 2).

On completion of the extraction process, the liquid solution is separated from the vegetable material. If this separation is effected with simultaneous pressure reduction, only a small portion of the second component will remain in the extraction system and can be removed through evacuation, heating, evaporation (if a solid material is processed) or rinsing with the first component or with other inert gases.

It has surprisingly been found that when solids are extracted, a small part of the second component, after the solution has been separated, almost always lies on the surface of the vegetable material. If the second component has a relative high volatility, the required redrying of the vegetable material will be sufficient to remove the second component almost completely. If the above-mentioned materials contained in the vegetable material are used as second component, residual concentrations are obtained therein on the order of the natural concentration.

In the case of isobaric separation of the solution, the space or volume it occupies in the extraction system may be filled by inert gases or, if the temperature is simultaneously being lowered, also by the pure liquid first component. An additional advantage of this separation method is that when the extraction system is subsequently emptied, residual quantities of the second component are so completely removed from the vegetable material that no additional treatment is needed for removing the residual solvents. After the solution has been removed, the vegetable material is processed in conventional manner.

The following is of great technical significance for the practical implementation of the method embodying the principles of the invention: If materials that are non-flammable and do not sustain combustion are used as the inherent gaseous component, it is preferable to use mixing proportions with second flammable components that have no explosive limits when mixed with air (cf. D. Conrad "Inertisierung reaktionsfähiger Gassysteme," BAM-Mitteilungen 1973, DK 614.837.4, and M. G. Zabetakis "Flammability Characteristics of Combustible Gases and Vapors," Bulletin 627, U.S. Bureau of Mines).

This allows the waiver of the safety measures normally required when flammable solvents are used.

In addition to caffeine, it is also possible to remove with a suitable composition of the solution in accordance with the invention, during the extraction of raw coffee, materials that contribute to the presence of undesired stimulants in roasted coffee. Carboxylic-5-hydroxytryptamides are utilized as an indicator for the successful reduction of such components (J. Wurziger "Carbonsäurehydroxitryptamide zur Beurteilung von frischen und bearbeiteten Kaffees," 5th International Colloquium on Coffee-Chemistry (Lisbon, June 14–19, 1971) ASIC Paris, pp. 383–387)).

Thus, if components are chosen for the solution to be used in accordance with the invention which, in addition to their dissolving power for caffeine, are also capable of dissolving materials that contribute to the presence of undesired stimulants in roasted coffee, it is possible to use the method embodying the principles of the invention for making coffee that is free not only from caffeine but also from undesired stimulants.

In the following section, the method according to the invention will be discussed with reference to the selective extraction of caffeine from raw coffee beans. In this instance, raw coffee beans having 15–55%, preferably 25–45%, water by weight are used. To moisten the coffee, it is treated in the usual manner with liquid water or steam. The water-containing raw coffee beans are extracted in the usual manner in accordance with any conventional solid-liquid extraction method, using continuous as well as batch techniques.

$CO_2$ is preferred as first component mixed with esters or glycerides, ketones, aliphatic compounds, as the case may be, preference being given to materials contained in coffee. Small amounts of ammonia may be utilized as admixture to the second component. For reasons of safety, the concentration of the second component, e.g., methyl acetate, deodorized raw coffee oil, acetone, hexane, is so selected that the solution according to the invention, when diluted with air, has no explosive limits. For example, in the case of acetone this concentration is 8 mole%. This solution is liquid at pressures in excess of 92 bars and at temperatures under approximately 58° C.

An illustrative embodiment of the invention will now be described with reference to the accompanying drawings, wherein:

FIG. 1 shows a cycle system for the decaffeination of a vegetable material, e.g., coffee, with the solution according to the invention, the caffeine being removed therefrom by adsorbents in adsorber 2. Extractor 1 contains a charge of the material to be extracted, e.g., wet raw coffee beans. The first component is fed to the extraction container from storage tank 8, Pump 6 feeds the second component into the cycle system. Circulation pump 3 circulates the liquid solution in the extraction circuit comprising extractor 1, adsorber 2, and heat exchanger 5. Adsorber 2 preferably contains activated carbon as an adsorbent. Heat exchanger 5 is designed to bring the solution to be used in accordance with the invention to the extraction temperature. The caffeine-laden solution in extractor 1 is decaffeinated in adsorber 2 and returns to extractor 1. The purity of the caffeine isolated from the adsorbent is in excess of 95%.

FIG. 2 shows a cycle system for decaffeinating a vegetable material, e.g., coffee, with the solution according to the invention, with the caffeine being removed from this solution, for example, by cooling it and bringing about a separation in two liquid phases. The phase separation of the homogeneous caffeine-laden solution flowing out of extractor 1 takes place in cooler 7. Assisted by circulating pump 3, the two-phase system originating in cooler 7 flows to separator 4, in which the phases are separated as a result of the difference in density between the two phases. The caffeine-laden phase containing the second component of the solution used for the extraction and forming the lower or upper phase, is appropriately separated and flows to separation system 9, where the caffeine is separated from the second component which, in turn, is fed back into the main circuit by pump 6. The medium which is cooled in 7 is reheated in heater 5.

In the cycle systems of FIGS. 1 and 2, the wet raw coffee becomes isobaric in the cycle system in the preferred 50–300-bar pressure range and is extracted isothermally until the required final caffeine content of, say, 0.07% by weight in relation to the dry substance, is attained. After charging the two components of the solution, the required extraction temperature is set during the circulation by means of the heat exchangers. The levels of both components are calculated in such a way that the desired extraction pressure is obtained.

After decaffeination, the solution is drawn off, the pressure simultaneously being reduced. The processed beans can be fed directly, without further steps, into a vacuum drier under normal operating conditions in order to remove the residual solvents. The beans are then roasted in the usual manner. From the sensory point of view, the infusion made from the roasted coffee is similar in quality to that of an unprocessed coffee.

EXAMPLES

1. In the system shown in FIG. 1, 26 kg raw coffee having a moisture content of 36.6% by weight was extracted for 8 hours at 40° C. and 90 bars, using a liquid mixture containing 92 mole% $CO_2$ and 8 mole% acetone. Activated carbon was utilized as an adsorbent. At the end of the processing period, the CO/acetone solution was removed from the system through pressure reduction, and the coffee was vacuum-dried immediately after removal.

Results of analysis:

|  | unprocessed raw coffee | decaffeinated raw coffee |
|---|---|---|
| Caffeine, % in dry substance | 1.15 | 0.072 |
| Extract, % in dry substance | 29.8 | 29.1 |
| Soluble in petroleum ether, % in dry substance | 10.2 | 10.3 |
| Humidity, % | 10.5 | 10.8 |
| Acetone, ppm | 6 | 13 |

2. 100 ml of an aqueous solution of raw-coffee extract having a total solids content of 19% by weight and a caffeine content of 0.6% by weight was placed for 15 minutes in an agitator autoclave at a pressure of 100 bars and a temperature of 50° C. to contact 1900 ml of a liquid solution comprising 12 mole% pentane, 88 mole% $CO_2$, to which was added 0.3% by weight of deodorized raw coffee oil. After the solution was separated from the aqueous extract, 1900 ml of a fresh liquid solution was again added and again stirred for 15 minutes. The aqueous extract was subjected to liquid-liquid extraction 12 times. When the treatment was terminated, the aqueous extract processed in this manner still had a caffeine content of 0.007% versus a total extraction content of 18.3%.

We claim:

1. A method for the selective extraction of caffeine or caffeine and other undesired stimulants as indicated by carboxylic-5-hydroxytryptamides from caffeine containing vegetable material with a liquid solvent characterized in that a two-component solution, (a) whose first component is inherently gaseous under operational conditions of temperature and pressure and is selected from the group of $CO_2$, $N_2O$, $SF_6$, Xe, $CF_4$, methane, ethane, ethylene, acetylene or cyclopropane, and (b) whose second component is an organic solvent which, by itself, has physical properties such that a mixture of (a) and (b) is liquid at the operating temperature, is used as a liquid solvent for said selective extraction of caffeine at a pressure of 50–300 bar pressure and wherein the relative amount of said first component to said second component is such that said pressure for the extraction is obtained, and further provided that when said solution contains one flammable component, the ratio of the first component to the second component is such that the solution is nonexplosive when mixed with air, and separating said liquid solvent containing caffeine from said vegetable material.

2. The method of claim 1 wherein said first component includes $CO_2$.

3. The method of claim 1 wherein said first component includes at least one gas selected from the group of $CO_2$, $N_2O$, $SF_6$, Xe, methane, ethane, ethylene, acetylene, or cyclopropane.

4. The method as described in claim 1, 2, or 3 characterized in that materials contained in said vegetable material are employed as said second component.

5. The method as described in claim 1, 2, or 3 characterized in that said vegetable material includes a member from the group of raw coffee beans, roasted coffee beans, tea, cola leaves, or aqueous extracts of said materials.

6. The method as described in claim 1, 2, or 3 characterized in that the operation is carried out in a temperature range between about 0° and about 100° C.

7. The method as described in claim 1 characterized in that said solvent is circulated and the caffeine is absorbed on an absorbent.

8. The method of claim 7 wherein said absorbent is activated charcoal.

9. The method as described in claim 1 characterized in that said solvent is circulated and the caffeine is separated from said solvent by phase separation by reducing or increasing the pressure or temperature or both.

10. The method of claim 9 wherein the separating is achieved by use of the miscibility gap between said components.

11. The method as described in claims 9 characterized in that the caffeine is removed from the cycle system by means of an aliquot of said second component, separated from said second component, and the pure said second component is returned to said cycle system.

12. The method as described in claim 1 characterized in that said solvent is separated after extraction from said vegetable material, while the pressure is simultaneously being reduced, and the remainder of said solvent is removed through evacuation, heating, evaporation, or rinsing with said first gaseous component or an inert gas.

13. The method as described in claim 1 characterized in that after extraction said solvent is removed isobarically from the extraction system and the volume occupied thereby is filled by inert gases or, with simultaneous lowering of the temperature, by the pure said liquid first component.

14. The method as described in claim 1 characterized in that said solution utilized for extraction contains flammable components wherein the mixture ratios used have no explosive limits when mixed with air.

15. The method as described in claim 1 characterized in that said components of the solution are chosen in such a manner for the extraction of raw coffee that, in addition to caffeine, other materials that contribute to the presence of undesired stimulants in roasted coffee are likewise removed.

16. The method of claim 1, 2, or 3 wherein the extraction is carried out at temperature between ambient and 90° C.

17. The method of claim 1, 2, or 3 wherein the extraction is carried out at temperature between 0° and 70° C.

18. The method of claim 1, 2, or 3 wherein said second component is selected from the group of aliphatic paraffin hydrocarbons, ketones, esters, or glycerides.

19. The method of claim 1, 2, or 3 wherein said second component is selected from the group of propane, butane, acetone, methyl ethyl ketone, methyl acetate, ethyl acetate, or glycerides.

20. The method of claim 1, 2, or 3 wherein said second component is acetone.

* * * * *